May 16, 1933.  D. G. MACKENZIE  1,908,991
STEERING ARRANGEMENT FOR MOTOR OR LIKE VEHICLES
Filed Nov. 15, 1929   2 Sheets-Sheet 1
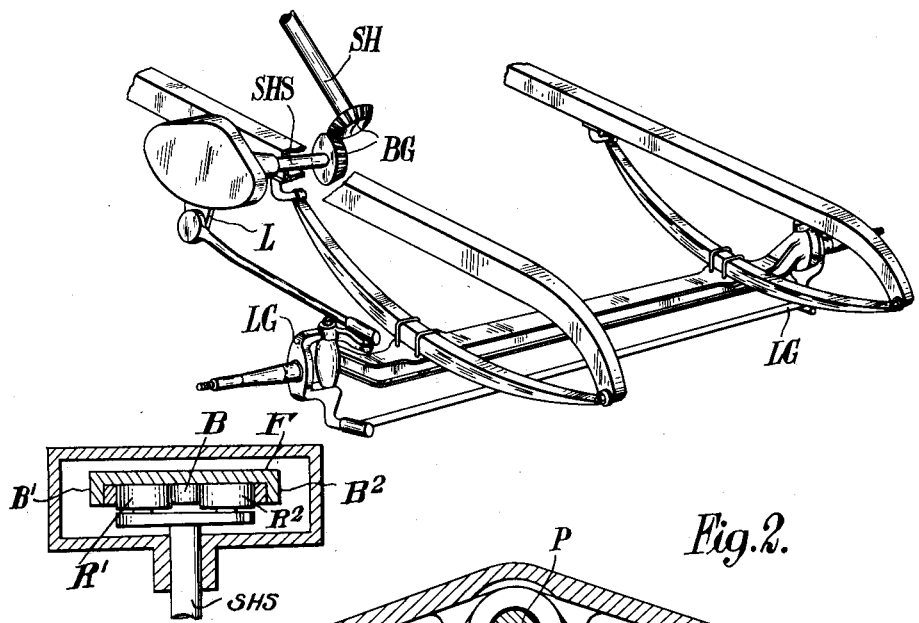
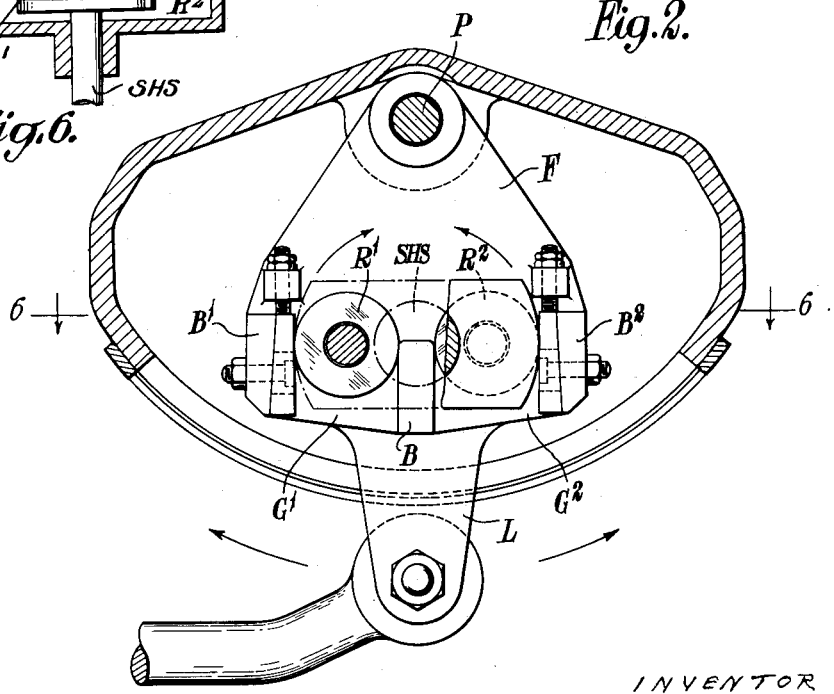
INVENTOR
Donald G. Mackenzie
By E. J. Fetherstonhaugh
Atty May 16, 1933. D. G. MACKENZIE 1,908,991
STEERING ARRANGEMENT FOR MOTOR OR LIKE VEHICLES
Filed Nov. 15, 1929 2 Sheets-Sheet 2
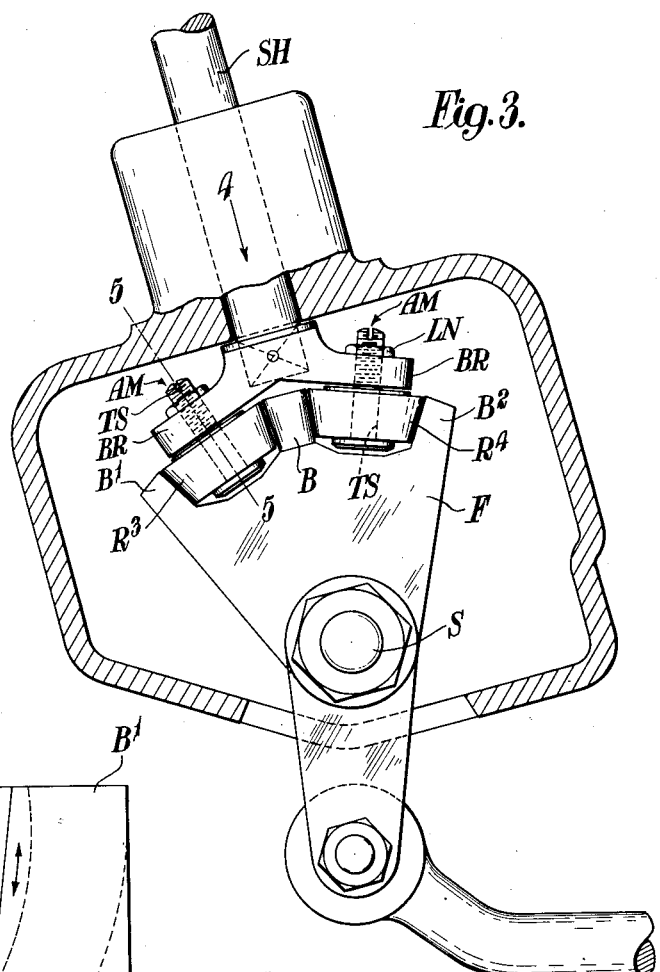
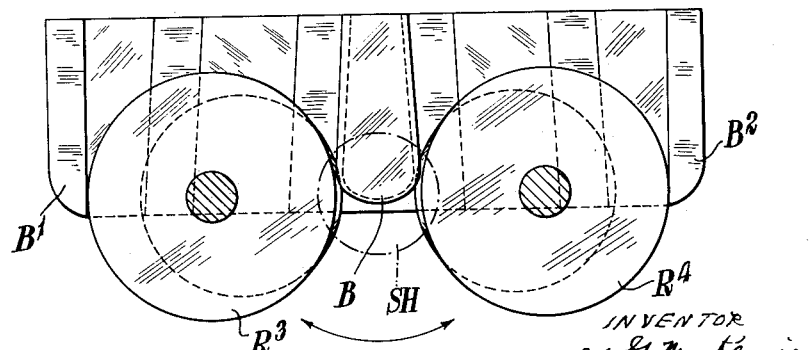

Patented May 16, 1933

1,908,991

UNITED STATES PATENT OFFICE

DONALD GORDON MACKENZIE, OF MONTREAL, QUEBEC, CANADA

STEERING ARRANGEMENT FOR MOTOR OR LIKE VEHICLES

Application filed November 15, 1929, Serial No. 407,529, and in Great Britain June 6, 1929.

The present invention relates to improvements in or relating to steering arrangements for motor or like vehicles and is more particularly concerned with the provision of a special controlling arrangement interposed between the steering handle and the linkage by which the steering wheels are operated which has the property that it is non-reversible when in a position for steering straight ahead yet is of the self centering type. It gives very little movement to the steering wheels for a considerable movement of the steering handle in the vicinity of the straight ahead position, while it gives an average or even an increased movement of the steering wheel for a given movement of the steering handle when making sharp turns such as occur in dense traffic.

Such arrangements which have previously been proposed for such a purpose have necessitated the provision of a special machined cam or like member and some have had the disadvantage that they have never been completely non-reversible in self centering, that is to say, when steering straight ahead road shocks are transmitted to the steering handle where they have to be taken up by the hand of the user if the car will straighten to a normal position after rounding a corner. In the present invention the road shocks are taken up by the mechanism itself, it being impossible when the car is going straight ahead for the road shocks to be transmitted to the steering handle itself yet the mechanism will automatically resume a normal position. In addition any wheel shivering that may occur is not transmitted to the steering wheel.

Another feature of the present invention is that, in order to allow for the wear occasioned by such road shocks, the bearing surfaces on which the road shocks are taken up are made adjustable so that they can be compensated for while the surfaces which are operated upon for causing motion of the steering wheel are not subjected to the road shocks, their wear depending simply upon the extent of operation of the steering wheel.

Two forms of carrying the invention into effect are illustrated in the accompanying drawings, in which:—

Figure 1 represents the steering arrangements in perspective, while

Figure 2 shows a controlling arrangement for use therewith.

Figure 3 shows an alternative arrangement which avoids the use of the bevel gear, shown in Figure 1, while Figure 4 shows a view of the rollers and grooves looking in the direction of the arrow 4 in Figure 3 but omitting all other details.

Figure 5 shows a section on the line 5—5, Figure 3.

Figure 6 is a cross sectional view on lines 6—6 in Figure 2.

Referring to Figures 1 and 2 the steering handle shaft SH controls the shaft SHS through bevel or suitable gearing BG. At the end of the shaft SHS is an arm extending at right angles to the shaft and carrying rollers R1, R2 at the same radial distance but diametrically opposite to each other. The rollers are adapted to engage with the outer faces of a block B fixed on to a frame F which is pivoted at P. It will be noted that when the rollers are in the mid position as shown, the plane passing through their axes also passes through the edges of the outer faces of the block B and through the axis of SHS. At the other side of the rollers are blocks B1 and B2 which can be adjusted by any known means. The blocks B1 and B2 are also secured to the frame F and this leaves grooves G1 and G2 into which the rollers R1 and R2 can run according to the direction in which the steering handle is turned. In the position shown it is assumed that the steering is for straight ahead. In this position it will be understood that the faces of block B which are engaged by the rollers R1 and R2 must lie on one side of the plane joining the axes of the rollers R1 and R2 in order to ensure that there is no jamming action of the steering shaft SHS. Further the inner faces of B1 and B2 should in this position be normal to the said plane so that road shocks are transmitted directly through the axis of the steering shaft SHS. At the lower end of the frame F is connected an arm L connected to the linkage LG by which the steering wheels are operated. This link L is shown connected to the lower part of the frame F but it will be understood that it could conveniently be connected to another part. The operation is as follows: If the steering wheel is turned so that the rollers R2 and R1 move in a clockwise direction then the block B and with it the frame F and the blocks B1 and B2 will be moved to the left. The movement will at first be slight but will increase at a greater rate as the arm supporting the rollers R1 and R2 reaches a position at right angles to the position shown. The roller R2 will of course advance further into the groove G2 but the roller R1 will move quite clear of the groove G1 so that the roller R2 is alone effective in steering to the right. On the other hand, if the steering wheel is turned from the position shown in a counter-clockwise direction, then R1 would become effective to move the block B to the right, the nature of the movement in this case being similar but in the opposite direction to that in the previous case, that is to say, the rate of movement for a given movement of the steering handle will increase as the arm carrying the rollers R1 and R2 approaches a position at right angles to that shown and decrease thereafter. The arm L will of course be moved a proportionate amount, being dependent upon the distance between pivot P and the point of the attachment of the arm L and the positions of the blocks B, B1 and B2.

In the position shown if there are road shocks conveyed through the link L to the pivoted frame F it will be noted that these will be taken up through the blocks B1 and B2 and the rollers R1 and R2 by the bearings supporting the shaft SHS as such shocks are normal or vertical to the direction of possible motion passing as they do directly through the axis of the shaft SHS so that by an occasional adjustment of the inner faces of the blocks B1 and B2 the wear on such faces due to this cause can be readily compensated. To ensure that no wear shall be occasioned on the faces of the block B due to this cause the edges will be chamfered slightly as shown, although in practice, the slightest degree of wear would cause the shocks to be taken up by the inner faces of the blocks B1 and B2. It will be noted that there is no sliding motion but only rolling so that there is no danger, as occurs with other arrangements employing sliding movements, of the steering wheel being jammed due to the expulsion of the lubricating medium in the case of a sudden shock.

It will be noted that in the arrangement shown the grooves G1 and G2 are shown parallel to each other and also symmetrical and parallel to the line passing through the pivot P and the centre of the block B. This, it should be pointed out, is not essential although it forms a very convenient construction for manufacture. The grooves G1 could be of a wide variety of shapes, i. e., by suitably shaping the outer faces of the block B and the inner faces of B1 and B2 so as to produce any desired modification of the ratio between the movement of the steering gear and the movement of the link L, although of course it should be borne in mind that if the outer surfaces of the block B are not normal to the line joining the rollers R1 and R2 there will be a certain amount of reversibility when the rollers are in the position shown.

Referring to Figures 3, 4 and 5, an alternative arrangement is shown in which the rollers or projections R3, R4 are mounted directly on the steering handle shaft SH instead of through bevelled gearing. The blocks B, B1 and B2 in this construction form an integral part of the frame F which is pivoted on a shaft S whose axis is at right angles to the axis of the shaft SH. The axis of the shaft SH meets the axis of the shaft S while, as in the previous construction, the axis of the shaft SH and the axis of the rollers R3, R4 lie in a single plane. The axis of the rollers R3, R4, however, instead of being parallel converge so as to meet in the axis of the shaft S and, furthermore, the edges of the rollers R3 and R4 are bevelled so that they also converge towards the axis of the shaft S.

It will be clear that the surfaces of the blocks B, B1 and B2 which are engaged by the rollers R3, R4 can have any desired curvature, but for convenience of manufacture it is desirable that the surfaces should be plane surfaces and furthermore, it is important that there should be a line of contact between the rollers and the surfaces of the block B, so as to reduce the wear to a minimum. In order to obtain this effect the rollers R3, R4 are mounted on self-aligning roller bearings of known construction.

It is found that in order to obtain the desired result the block B should be tapered slightly, as shown in front elevation in Figure 4, both in the upward direction shown and also in a radial direction as regards the axis of the shaft S. Similarly, the inner surfaces of the blocks B1, B2 must be shaped correspondingly and a shape which has been found satisfactory is shown in the drawings in plan view in Figure 3 and in end elevation in Figure 4. The dotted lines in Figure 5 illustrate the path traversed by the line of contact between the surfaces B1 and the roller R3. The rollers R3 and R4 being bevelled can themselves be made adjustable so as to compensate for wear and tear and a convenient form of adjusting means AM is illustrated in Figure 3 of the drawings, which simply consists of a threaded shaft TS which engages with a thread in the bracket BR secured to the shaft SH and a lock nut LN which locks the shaft T3 when it has been adjusted to the desired position.

It will be appreciated that the invention contemplates a steering gear arrangement which is completely non-reversible in "straight ahead" positions, together with gradually increasing turning motion of the wheels relatively to the motion of the steering handle up to a limit when the turning motion of the wheel gradually decreases so that a powerful leverage becomes available for extreme locks.

Various modifications of this construction will readily occur to those versed in the art and it should be understood that this construction is given by way of example only, and that all such modifications as constitute recognizable equivalents will come within the scope of the invention.

Such an alternative construction may be one in which the axis about which the frame F is pivoted instead of being parallel to or at right angles to the axis about which the rollers rotate is at some other angle, in which case, of course, a suitable modification would be necessasry in the design of the surfaces of the blocks B, B1 and B2, as will be well understood.

I claim:—

1. In steering mechanism, a shaft suitably journalled and operated, a bracket fixedly mounted at the inner end of said shaft and forming a crosshead, pivot bearings projecting from said crosshead, rollers mounted on said bearings, a frame pivotally mounted and having a lever extension at one end and arcuate roller tracks separated by a central block having rolling surfaces extending over its outer end and a connecting rod pivotally secured to the lever end.

2. In steering mechanism, a shaft suitably journalled and operated, a bracket fixedly mounted at the inner end of said shaft and forming a crosshead, pivot bearings projecting from said cross-head, rollers mounted on said bearings, a casing, a frame forming a lever and pivotally hung in said casing and having arcuate tracks and a central block extending centrally between said tracks and terminating intermediate of the length thereof and forming rolling surfaces on the sides and ends of said rollers and a connecting rod secured to said lever.

3. In steering mechanism, a shaft suitably journalled and operated, a bracket fixedly mounted at the inner end of said shaft and forming a crosshead, pivot bearings projecting from said crosshead, rollers mounted on said bearings, a casing, a frame hung intermediately of its length in said casing and having a lever end projecting therefrom and transverse arcuate tracks for said rollers at one end and a central block between said tracks and rollers and forming guide surfaces on the sides and end, and a connecting rod from said lever.

4. In steering mechanism, a shaft suitably journalled and operated, a bracket fixedly mounted at the inner end of said shaft and forming a crosshead, pivot bearings projecting from said crosshead, rollers mounted on said bearings, a casing, a lever pivotally secured in said casing and projecting therefrom and extending into a track frame grooved at either side and divided by a central block having a continuous rolling surface on sides and end and a connecting rod from said lever.

5. In steering mechanism, a shaft suitably journalled and operated, a bracket fixedly mounted at the inner end of said shaft and forming a crosshead, pivot bearings projecting from said crosshead, rollers mounted on said bearings, a casing, a frame forming a lever and pivotally hung and having arcuate grooves forming tracks and adjusting strips for said tracks and a central block between tracks and rollers ending short of the length of the tracks, and having rolling surfaces on either side extending on to the end and a connecting rod from said lever.

DONALD GORDON MACKENZIE.